(12) United States Patent
Seemann et al.

(10) Patent No.: US 12,240,329 B2
(45) Date of Patent: Mar. 4, 2025

(54) DEVICE FOR PROVIDING AN OPERATING POWER FOR AN AUXILIARY DRIVE FOR AN ELECTRIC VEHICLE AND METHOD FOR CONVERTING AN OPERATING VOLTAGE

(71) Applicant: ZF Friedrichshafen AG, Friedrichshafen (DE)

(72) Inventors: Frank Seemann, Euerbach (DE); Andre Ehrsam, Bergrheinfeld (DE); Martin Mach, Plzen (CZ); Zbynek Štepán, Plzen (CZ); Vladimir Dvorak, Schwandorf (DE); Gabriel Scherer, Deggenhausertal (DE); Matthias Engicht, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/032,987

(22) PCT Filed: Oct. 18, 2021

(86) PCT No.: PCT/EP2021/078803
§ 371 (c)(1),
(2) Date: Apr. 20, 2023

(87) PCT Pub. No.: WO2022/084245
PCT Pub. Date: Apr. 28, 2022

(65) Prior Publication Data
US 2023/0382227 A1 Nov. 30, 2023

(30) Foreign Application Priority Data
Oct. 22, 2020 (DE) ............... 10 2020 213 312.3

(51) Int. Cl.
*B60L 1/00* (2006.01)
*H02J 7/14* (2006.01)

(52) U.S. Cl.
CPC .............. *B60L 1/003* (2013.01); *B60L 1/20* (2013.01); *H02J 7/1415* (2013.01); *H02J 7/1446* (2013.01); *B60L 2210/40* (2013.01)

(58) Field of Classification Search
CPC ........ B60L 1/003; B60L 1/20; B60L 2210/40; H02J 7/1415; H02J 7/1446
See application file for complete search history.

(56) References Cited

U.S. PATENT DOCUMENTS

2012/0079821 A1 4/2012 Mazumdar
2014/0265942 A1 9/2014 Li

FOREIGN PATENT DOCUMENTS

DE 10 2012 007 158 A1 10/2013
DE 10 2012 014 673 A1 1/2014
(Continued)

*Primary Examiner* — Daniel Cavallari
(74) *Attorney, Agent, or Firm* — COZEN O'CONNOR

(57) ABSTRACT

Apparatus (102) for providing an operating energy (110) for an auxiliary drive (106) for an electric vehicle (100). The apparatus (102) has a battery interface (112) for connecting the apparatus (102) to a vehicle battery (104), a bidirectional inverter (114) having a first terminal for connecting the inverter (114) to the battery interface (112) and a second terminal. The inverter (114) is formed to convert a DC voltage into an AC voltage and back. A switch with a terminal which the switch to the second terminal, to an auxiliary interface (116) for connecting the apparatus (102) to the auxiliary drive (106) and to a charge interface (212) for feeding electrical energy (214) into the apparatus (102). The switch connects the charge interface to the switch and to the auxiliary interface (116). The apparatus (102) has a control device for providing the boost signal and the charge signal.

13 Claims, 3 Drawing Sheets

(56) References Cited

FOREIGN PATENT DOCUMENTS

| | | | |
|---|---|---|---|
| DE | 10 2017 203 063 A1 | 12/2017 | |
| EP | 2519419 A1 * | 11/2012 | .............. B60L 1/003 |
| EP | 2519419 | 12/2019 | |
| WO | WO 2015143088 | 9/2015 | |
| WO | WO 2020068637 | 4/2020 | |
| WO | WO 2020068646 | 4/2020 | |
| WO | WO-2020068646 A1 * | 4/2020 | ......... B60H 1/00014 |

* cited by examiner

DEVICE FOR PROVIDING AN OPERATING POWER FOR AN AUXILIARY DRIVE FOR AN ELECTRIC VEHICLE AND METHOD FOR CONVERTING AN OPERATING VOLTAGE

PRIORITY CLAIM

This is a U.S. national stage of application No. PCT/EP2021/078803, filed on 18 Oct. 2021. Priority is claimed on German Application No. 10 2020 213 312.3 filed on 20 Oct. 2020 the content of which is incorporated herein by reference.

BACKGROUND OF THE INVENTION

The present invention is directed to an apparatus for providing an operating power for an auxiliary drive for an electric vehicle and to a method for converting an operating voltage for an electric vehicle with an apparatus.

Electrified vehicles are becoming increasingly important industrially for their environmental friendliness. The goal is for not only passenger vehicles but also utility vehicles to be driven electrically.

SUMMARY OF THE INVENTION

The present invention provides an improved apparatus for providing an operating power for an auxiliary drive for an electric vehicle and an improved method for converting an operating voltage for an electric vehicle according to the main claims. Advantageous embodiments will be apparent from the subclaims and the following description.

The approach suggested herein will provide an opportunity for applications of an electrified vehicle, advantageously of a utility vehicle, which are operated when stationary to be energized by means of a vehicle battery and, at the same time, to ensure an energy supply in the vehicle battery. This can be achieved in that the vehicle battery can be charged during the operation of an auxiliary drive.

An apparatus is suggested for providing an operating power for an auxiliary drive for an electric vehicle. To this end, the apparatus has a battery interface, a bidirectional inverter, a switch device and a control device. The battery interface is formed to connect the apparatus to a vehicle battery of the electric vehicle. The bidirectional inverter has a first terminal for connecting the inverter to the battery interface and a second terminal and is formed to convert a DC voltage applied to the first terminal into an AC voltage in response to a boost signal and to provide this AC voltage at the second terminal. Further, the inverter is formed to convert an AC voltage applied to the second terminal into a DC voltage in response to a charge signal and to provide this AC voltage at the first terminal. The switch device has a switch terminal which connects the switch device to the second terminal of the inverter, to an auxiliary interface for connecting the apparatus to the auxiliary drive and to a charge interface for feeding electrical energy into the apparatus. The switch device is formed to connect the charge interface to the switch terminal using a switch signal and to connect the charge interface to the auxiliary interface using the switch signal. The control device is formed to provide the boost signal for a boost function and to provide the charge signal for a charge function.

The apparatus can be part of an electric vehicle or installed in an electric vehicle, for example. The electric vehicle can be implemented, for example, as an electrified utility vehicle. A utility vehicle may be, for example, an excavator or a truck having, e.g., a crane suspension. The auxiliary drive can be formed to provide a functionality going beyond locomotion of the vehicle. For example, the auxiliary drive can be used to drive an excavator bucket or a crane of the electric vehicle. The switch device can have, for example, a plurality of switches which can be opened and closed depending on a desired function, for example. For example, an auxiliary function of the electric vehicle such as driving the crane can be effected. For example, when the charge interface is connected to the switch terminal, a portion of the electrical power can advantageously be provided at the inverter as charging power for charging the vehicle battery. If the charge interface is connected to the auxiliary interface, for example, at least a further portion of the electrical power can be provided as auxiliary power at the auxiliary interface for operating the auxiliary drive. Accordingly, in an advantageous manner, it is not necessary to increase the size of the vehicle battery. Instead, a dual function of the vehicle battery is advantageously possible.

According to an embodiment form, the control device can be formed to provide the charge signal when an actual power value of the electrical energy applied to the charge interface is greater than a reference value for the operating power. For example, the charge signal can cause the charging power to be provided at the inverter and the auxiliary power to be provided at the auxiliary interface. A charge function is advantageously activated in this way. In an advantageous manner, the auxiliary drive can be driven and the vehicle battery can be charged at the same time in this way.

According to an embodiment form, the control device can be formed to provide the charge signal when an actual speed of the auxiliary drive is greater than a reference speed of the auxiliary drive. The actual speed can advantageously be acquired by means of a tachometer.

The control device can be further configured to provide the boost signal when an actual power value of the electrical power applied to the charge interface is less than a reference value for the operating energy. In an advantageous manner, a boost function can be brought about in that, for example, a boost energy provided by the vehicle battery is provided at the auxiliary interface.

According to an embodiment form, the control device can be formed to provide the boost signal when an actual speed of the auxiliary drive is less than a reference speed of the auxiliary drive. The actual speed can advantageously be acquired by means of a tachometer. In an advantageous manner, the boost function can be activated by the boost signal so that the speed of the auxiliary drive can advantageously be adapted.

The apparatus can further have a detection device for detecting an electrical power and, additionally or alternatively, a mechanical power of the auxiliary drive and for providing an actual power signal at an interface to the control device. The power signal can represent the electrical power and, additionally or alternatively, the mechanical power of the auxiliary drive. The detection device can be implemented, for example, as a power gauge or, for example, as a tachometer. The electrical power and, additionally or alternatively, mechanical power to be detected can refer to the provided operating energy or to the actual speed. The detection device is advantageously arranged between the auxiliary interface and the auxiliary drive and can be implemented, for example, as a sensor unit.

According to an embodiment form, the switch device can have an energization interface for energizing an appliance that is coupled with the energization interface. The switch device can be formed to connect the switch terminal to the charge interface, the auxiliary interface and, additionally or alternatively, to the energization interface using the switch signal. An extra-vehicular appliance can advantageously be connected to the energization interface.

According to an embodiment form, the switch device can have a drive interface for energizing a drive motor of the electric vehicle that is connected to the drive interface. The switch device can be formed to connect the switch terminal to the drive interface or to the auxiliary interface or to the charge interface using the switch signal. Accordingly, the electric vehicle can advantageously be moved by means of the same device that drives the auxiliary drive.

According to an embodiment form, the inverter and the switch device can be arranged in a common housing. In this way, the inverter and the switch device are advantageously arranged in the electric vehicle so as to be protected from environmental influences, for example. The common housing can have the size of a typical inverter housing.

Further, a method is provided for converting an operating voltage for an electric vehicle with an apparatus in one of the variants mentioned above, a vehicle battery and an auxiliary drive. The method comprises a conversion step, a connection step and a provision step. In the conversion step, a DC voltage applied to the first terminal of the inverter is converted into an AC voltage and the AC voltage is provided at the second terminal of the inverter. Further, in the conversion step, an AC voltage applied to the second terminal is converted into a DC voltage and the DC voltage is provided at the first terminal. In the connection step, the switch terminal is connected to the second terminal, the charge interface and, additionally or alternatively, the auxiliary interface using a switch signal. In the provision step, the boost signal is provided for a boost function and the charge signal is provided for a charge function.

The boost function or the charge function can advantageously be activated by the method.

According to an embodiment form, the method can comprise a step of determining the switch signal depending on an operation function of the electric vehicle. This means that, for example, a driver of the electric vehicle can determine which function is to be activated by means of an operator control device.

Further, the method according to an embodiment form can comprise a step of switching from the charge function to the boost function when the actual energy value falls below the threshold value or a step of switching from the boost function to the charge function when the actual energy value exceeds the threshold value. This means that it is advantageously possible to switch automatically between the boost function and the charge function depending on the actual energy value.

BRIEF DESCRIPTION OF THE DRAWINGS

The invention will be described in more detail by way of example referring to the accompanying drawings. The drawings show.

DETAILED DESCRIPTION OF THE PRESENTLY PREFERRED EMBODIMENTS

Figure 1:
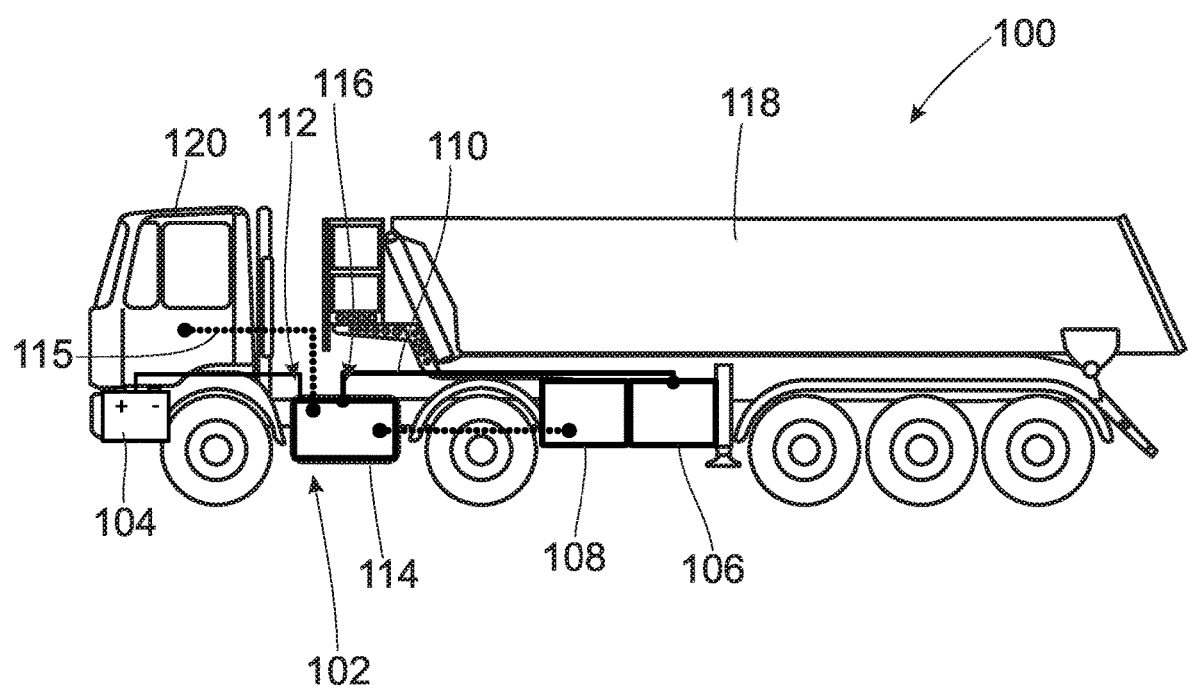
FIG. 1 a schematic diagram of an electric vehicle with an apparatus according to an embodiment example.

In the following description of preferred embodiment examples of the present invention, comparable elements depicted in the various figures are provided with identical or like reference numerals so as to avoid repetitive description of these elements.

FIG. 1 shows a schematic diagram of an electric vehicle 100 with an apparatus 102 according to an embodiment example. According to this embodiment example, the electric vehicle 100 is implemented as an electrified truck. Apart from the apparatus 102, the electric vehicle 100 has a vehicle battery 104, and auxiliary drive 106 and, merely optionally, a hydraulic device 108.

The apparatus 102 is formed to provide an operating energy 110 for the auxiliary drive 106. The apparatus 102, as is illustrated in more detail in one of the following figures, has a battery interface 112 which is formed to connect the apparatus 102 to the vehicle battery 104. The apparatus 102 further has a bidirectional inverter 114 which has a first terminal, not shown, and a second terminal. The inverter 114 is connected to the battery interface 112 by means of the first terminal. Further, the inverter 114 is formed to convert a DC voltage applied to the first terminal into an AC voltage in response to a boost signal and to provide this AC voltage at the second terminal and to convert an AC voltage applied to the second terminal into a DC voltage in response to a charge signal and provide this DC voltage at the first terminal.

The apparatus 102 further has a switch device which is described in more detail in one of the following figures and has a switch terminal. The switch device is connected to the second terminal of the inverter 114, to an auxiliary interface 116 for connecting the apparatus 102 to the auxiliary drive 106 and to a charge interface for feeding electrical energy into the apparatus 102. The switch device is formed to connect the charge interface to the switch terminal using a switch signal and to connect the charge interface to the auxiliary interface 116 using the switch signal. The apparatus 102 further has a control device by means of which a boost function is provided by means of the boost signal and a charge function is provided by means of the charge signal.

According to this embodiment example, the auxiliary drive 106 is formed, for example, to drive or move the hydraulic device 108. According to this embodiment example, the hydraulic device 108 is formed as a hydraulic pump by means of which, for example, a vehicle body 118 of the electric vehicle 100 is moved.

According to an embodiment example, functions of the electric vehicle 100 can be controlled by an operator using an operator control device. For example, it is possible for a driver of the electric vehicle 100 to control the auxiliary drive 106 using the operator control device from a driver's cab 120 of the electric vehicle 100. The operator control device is formed to provide an operation signal 207 at the apparatus 102 representing a command of an operator. According to an embodiment example, the control device of the apparatus 102 is formed to determine the switch signal and, optionally, the boost signal and/or the charge signal using the operation signal 115.

With the transition to electrically driven utility vehicles, referred to herein as electric vehicle 100, possibilities for power takeoffs are changing. Builders who create work functions require a new interface to operate the superstructures. According to this embodiment example, it is conceivable to use the vehicle battery 104 as new interface. The inverter 114 is required in order to draw energy from the vehicle battery 104 and operate, for example, a three-phase motor, referred to herein as auxiliary drive 106. According to this embodiment example, a possibility is suggested for implementing stationary work functions of an electric vehicle 100 of this kind which requires, for example, cranes, concrete pumps, work platforms or grist mills, and at the same time for sparing the vehicle battery 104.

Such an approach generally lends itself to applications which are operated in a quasi-stationary manner, for example, concrete pumps or grain mills, and which have a high energy requirement. Very large batteries would be required as the result of a self-supporting operation in which the energy supply was carried out exclusively from the individual vehicle battery 104. Drawing energy exclusively from the vehicle battery 104 would also reduce the mileage of the electric vehicle 100. This can be avoided in that electrical energy is fed in during the operation of such applications via the charge interface and is utilized for operating these applications.

In other words, a multifunctional apparatus 102 is suggested which is can be used for work in parallel with the charging of the vehicle battery 104. This means that the apparatus 102 draws power, for example, from a power supply, in order to operate a work function and charges the vehicle battery 104 at the same time. According to this embodiment example, the operation of the work function takes priority so that only unneeded power is used for the charge function. In addition, it is possible according to this embodiment example to utilize power for the work function in the form of the boost function additionally via the same path, i.e., via the battery interface 112.

It is a principal function of the apparatus 102 according to this embodiment example to convert the electrical energy into various other forms of electrical energy in order, for example, to energize drives such as, e.g., the auxiliary drive 106, and to charge and/or protect the vehicle battery 104. Mechanical devices, hydraulic devices 108 or pneumatic devices, for example, can be controlled by the auxiliary drive 106.

Figure 2:
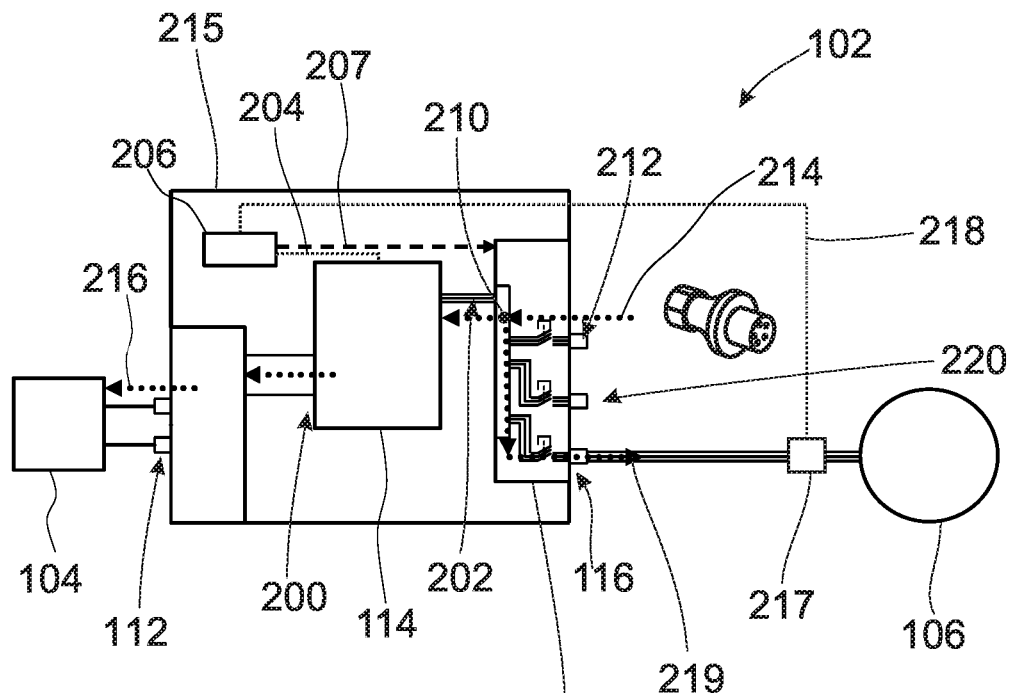
FIG. 2 a schematic diagram of an apparatus for providing an operating energy for an auxiliary drive for an electric vehicle according to an embodiment example.

FIG. 2 shows a schematic diagram of an apparatus 102 for providing an operating energy for an auxiliary drive 106 for an electric vehicle according to an embodiment example. The apparatus 102 shown here can correspond to, or is at least similar to, the apparatus 102 described in FIG. 1 and is accordingly used or usable in an electric vehicle as was described referring to FIG. 1. According to this embodiment example, a possibility is shown for charging the vehicle battery 104 via the battery interface 112. The bidirectional inverter 114 has the first terminal 200 for connecting the inverter 114 to the battery interface 112 and the second terminal 202.

According to this embodiment example, the inverter 114 is formed to convert an AC voltage applied to the second terminal 202 into a DC voltage in response to a charge signal 204 provided by the control device 206 for the charge function and to provide this DC voltage at the first terminal 200 for charging the vehicle battery 104. According to an embodiment example, the control device 206 is further formed to provide a switch signal 207.

The switch device 208 has the switch terminal 210 which connects the switch device 208 to the second terminal 202 of the inverter 114. The switch device 208 further has the auxiliary interface 116 for connecting the apparatus 102 to the auxiliary drive 106 and the charge interface 212 for feeding electrical energy 214 into the apparatus 102. The switch device 208 is formed to connect the charge interface 212 to the switch terminal 210 and to the auxiliary interface 116 using the switch signal 207. Merely optionally, the inverter 114 and the switch device 208 and, also optionally, the control device 206 are arranged in a common housing 215. Alternatively, it is contemplated to arrange the inverter 114, the switch device 208 and/or the control device 206 separate from one another in the electric vehicle.

According to this embodiment example, the control device 206 is formed to provide the charge signal 204 when an actual energy value of the electrical energy 214 is greater than a reference value for the operating energy or when an actual speed of the auxiliary drive 106 is greater than a reference speed of the auxiliary drive 106. This means that the charge function is carried out when the amount of energy fed into the apparatus 102 is greater than the amount of energy required for the auxiliary drive 106. In this case, the surplus amount of energy charges the vehicle battery 104 as charge energy 216. To this end, the apparatus 102 according to this embodiment example has a detection device 217 for detecting an electrical and/or mechanical power of the auxiliary drive 106. According to this embodiment example, the detection device 217 is formed to provide an actual power signal 218 at an interface to the control device 206, the power signal 218 representing the electrical and/or mechanical power of the auxiliary drive 106. Optionally, the detection device 217 is realized as a power meter or, for example, as a tachometer which measures, e.g., the auxiliary energy 219 provided at the auxiliary interface 116 or the actual speed of the auxiliary drive 106.

According to this embodiment example, the switch device 208 merely optionally has an energization interface 220 for energizing an appliance coupled with the energization interface 220. The switch device 208 is optionally formed to connect the switch terminal 210 to the charge interface 212, the auxiliary interface 116 and/or the energization interface 220 using the switch signal 207. The switch device 208 further merely optionally has a drive interface, not shown, which is formed, for example, to energize a drive motor of the electric vehicle connected to the drive interface. The switch device 208 is formed to connect the switch terminal 210 to the drive interface, auxiliary interface 116 or charge interface 212 using the switch signal 207. This enables a driving function for the electric vehicle, for example. This means that it is contemplated to also use an apparatus 102 as depicted and described herein for a driving operation of the electric vehicle.

According to this embodiment example, a possibility is described for enabling performing work and charging the vehicle battery 104 simultaneously. In so doing, a power supply, which is referred to according to this embodiment example as a charge interface 212 or is connected to the charge interface 212, is utilized to operate a work function, that is, to operate the auxiliary drive 106. The unneeded power or amount of energy referred to here as the charge energy 216 is used to charge the vehicle battery 104. Low-load phases and idle times of the work function are advantageously utilized in this way.

Correspondingly, the charge energy 216 is given by the difference of the energy provided at the charge interface 212 and the required auxiliary energy 219.

According to an embodiment example, the control device 206 is formed to provide the charge signal 214 and, simultaneously, the switch signal 207 with a signal characteristic by means of which the switch device 208 is switched in such a way that the switch terminal 210 is electrically conductively connected to the charge interface 212 and the auxiliary interface. In a further operation function, the control device 206 according to an embodiment example is formed to provide the switch signal 207 with a divergent signal characteristic by means of which the switch device 208 is switched in such a way that the switch terminal 210 is electrically conductively connected, for example, only to the charge interface 212, only to the auxiliary interface 116, only to the energization interface 220 or to a combination of interfaces 116, 212, 220 which is adapted to the further operation function.

According to an embodiment example, the housing 215 has external connections to form the battery interface 112, the charge interface 212, the auxiliary interface 116 and, optionally, the energization interface 220.

For example, the vehicle battery 104 is constructed as a 650 VDC high-voltage battery and the battery interface 112 comprises high-voltage connections. The inverter 114 is constructed, for example, as a DC/AC inverter. The bidirectionality of the inverter 114 pertains to the operation of the auxiliary drive 106, 400 VAC and charging. The charge interface 212 is realized, for example, as charge terminal 3~AC, and the energization interface 220 is realized, for example, as 400 VAC/50 Hz output.

Figure 3:
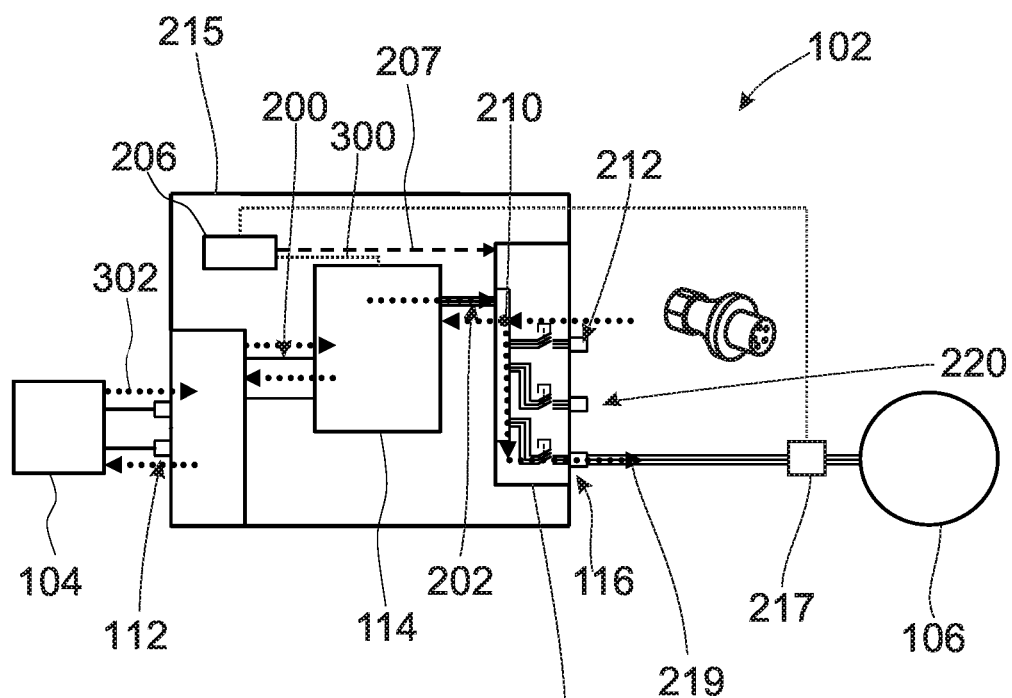
FIG. 3 a schematic diagram of an apparatus for providing an operating energy for an auxiliary drive for an electric vehicle according to an embodiment example.

FIG. 3 shows a schematic view of an apparatus 102 for providing an operating energy for an auxiliary drive 106 for an electric vehicle according to an embodiment example. The apparatus 102 shown here can correspond to, or at least resemble, the apparatus 102 described referring to FIG. 2. The apparatus 102 shown in this case can likewise be arranged in an electric vehicle as was described in FIG. 1.

According to this embodiment example, the bidirectional inverter 114 is formed to convert a DC voltage applied to the first terminal 200 into an AC voltage in response to a boost signal 300 and to provide this AC voltage at the second terminal 202 for operating the auxiliary drive 106. The boost signal 300 is provided by the control device 206 in order to bring about a boost function. As a result of the boost function, a boost energy 302 of the vehicle battery 104, for example, is provided at the auxiliary interface 116 in addition to the electrical energy provided at the charge interface 212 so that the auxiliary drive 106 obtains sufficient auxiliary energy 219 in this case. The auxiliary energy 219 is accordingly formed of the energy provided by the vehicle battery 104 and the energy provided at the charge interface 212. Correspondingly, the boost energy 302 provided by the vehicle battery 104 is the difference of the auxiliary energy 219 and the energy provided at the charge interface 212. This means that the control device 206 provides the boost signal 300 when an actual energy value of the electrical energy applied to the charge interface 212 is less than a reference value for the operating energy or when an actual speed of the auxiliary drive 106 is less than a reference speed of the auxiliary drive 106. Also according to this embodiment example, the apparatus 102 has the detection device 217 realized as power meter or tachometer.

It is advantageously possible to realize a continuously adaptable power adaptation which continuously takes into account how much energy must be charged and how much energy must be boosted. If more energy is needed than is provided at the charge interface 212, additional power, designated as boost energy 302, is made available for the work function by means of the vehicle battery 104. It is advantageous when the inverter 114 is realized so as to be synchronized with the power supply. Optionally, a three-phase power meter, for example, an energy meter connected to the control device 206 of the apparatus 102, is used. When the auxiliary drive 106 is constructed, for example, as electric work motor, the power adaptation is realized according to an embodiment example via the speed of the auxiliary drive 106. When the reference speed increases, power can be used for charging the vehicle battery 104 or possibly a further battery. When the reference speed decreases, the output of the power supply is not sufficient and must be boosted, i.e., for example, energy must be taken from the vehicle battery 104.

According to an embodiment example, the inverter 114 is formed to switch between the boost function and the charge function as needed. Accordingly, the vehicle battery 104 can be charged, for example, when more electrical energy is temporarily provided at the charge interface 212 than is needed by the auxiliary drive 106. To this end, the control device 206 according to an embodiment example is formed to continuously compare the amounts of electrical energy available at the charge interface 212 with the electrical energy needed at the auxiliary interface 116 and, depending on the ratio of the amounts, either to provide the boost signal 300 when less electrical energy than needed can be fed in at the charge interface or to provide the charge signal when more electrical energy can be fed in at the charge interface than is needed at the auxiliary interface 116.

According to embodiment example, the control device 206 is formed to provide the boost signal 230 and, at the same time, the switch signal 207 with a signal characteristic by means of which the switch device 208 is switched in such a way that the switch terminal 210 is electrically conductively connected to the charge interface 212 and the auxiliary interface.

Figure 4:
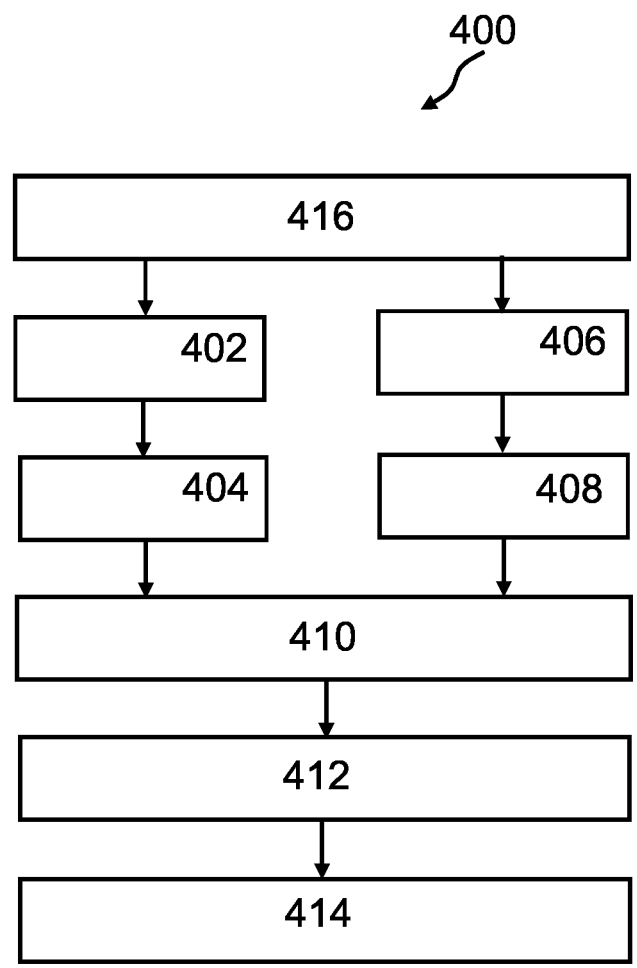
FIG. 4 a flowchart of a method for providing an operating energy for an auxiliary drive for an electric vehicle with an apparatus according to an embodiment example.

FIG. 4 shows a flowchart of a method 400 for providing an operating energy for an auxiliary drive for an electric vehicle according to an embodiment example. The method 400 can be carried out, for example, by a control device of an apparatus such as was described in one of FIG. 2 or 3. The method 400 can be implemented, for example, in an electric vehicle such as was described in FIG. 1. The method 400 comprises a step 402 of converting a DC voltage applied to the first terminal of the inverter into an AC voltage, a step 404 of providing the AC voltage at the second terminal of the inverter, a step 406 of converting an AC voltage applied to the second terminal into a DC voltage, and a step 408 of providing the DC voltage at the first terminal. Conversion steps 402, 406 and provision steps 404, 408 can be carried out in parallel, consecutively or alternatively to one another, for example.

The method 400 further comprises a step 410 of connecting the switch terminal to the second terminal, the charge interface and/or the auxiliary interface using a switch signal and a step 412 of providing the boost signal for a boost function and the charge signal for a charge function. According to this embodiment example, the method 400 further comprises a step 414 of converting from the charge function to the boost function when the actual energy value falls below the threshold value or from the boost function to the charge function when the actual energy value increases beyond the threshold value.

Further optionally, the method 400 comprises a step 416 of determining the switch signal depending on an operation function of the electric vehicle. The determination step 416 is carried out according to this embodiment example prior to the conversion steps 402, 406. According to an embodiment example, the switch signal or an operator signal which causes the switch signal is provided by a user by means of an operator control device.

The invention claimed is:

1. An apparatus for providing an operating energy for an auxiliary drive for an electric vehicle, wherein the apparatus comprising:
   a battery interface configured to connect the apparatus to a vehicle battery of the electric vehicle;
   a bidirectional inverter having a first terminal configured to connect the inverter to the battery interface and a second terminal, wherein the inverter is formed to convert a DC voltage applied to the first terminal into an AC voltage in response to a boost signal and to provide this AC voltage at the second terminal and to convert an AC voltage applied to the second terminal into a DC voltage in response to a charge signal and to provide this AC voltage at the first terminal; and
   a switch device with:
      a switch terminal which connects the switch device to the second terminal of the inverter;
      an auxiliary interface configured to connect the apparatus to the auxiliary drive; and
      a charge interface configured to feed electrical energy into the apparatus,
      wherein the switch device is formed to connect the charge interface to the switch terminal using a switch signal and to connect the charge interface to the auxiliary interface using the switch signal;
   a control device which is formed to provide the boost signal for a boost function and to provide the charge signal for a charge function; and
   a detection device for detecting an electrical and/or mechanical power of the auxiliary drive and for providing an actual power signal at an interface to the control device,
   wherein the power signal represents the electrical power and/or mechanical power of the auxiliary drive.

2. The apparatus according to claim 1, wherein the control device is formed to provide the charge signal when an actual energy value of the electrical energy applied to the charge interface is greater than a reference value for the operating energy.

3. The apparatus according to claim 1, wherein the control device is formed to provide the charge signal when an actual speed of the auxiliary drive is greater than a reference speed of the auxiliary drive.

4. The apparatus according to claim 1, wherein the control device is formed to provide the boost signal when an actual energy value of the electrical energy applied to the charge interface is less than a reference value for the operating energy.

5. The apparatus according to claim 1, wherein the control device is formed to provide the boost signal when an actual speed of the auxiliary drive is less than a reference speed of the auxiliary drive.

6. The apparatus according to claim 1, wherein the switch device has an energization interface for energizing an appliance that is coupled with the energization interface, and wherein the switch device is formed to connect the switch terminal to one or more of the charge interface, the auxiliary interface, and to the energization interface using the switch signal.

7. The apparatus according to claim 1, wherein the switch device has a drive interface for energizing a drive motor of the electric vehicle, which drive motor is connected to the drive interface, and wherein the switch device is formed to connect the switch terminal to the drive interface or to the auxiliary interface or to the charge interface using the switch signal.

8. The apparatus according to claim 1, wherein the inverter and the switch device are arranged in a common housing.

9. A method for converting an operating energy for an auxiliary drive for an electric vehicle with an apparatus according to claim 1, wherein the method comprises:
   converting a DC voltage applied to the first terminal of the inverter into an AC voltage and providing the AC voltage at the second terminal of the inverter, and
   converting an AC voltage applied to the second terminal into a DC voltage and providing the DC voltage at the first terminal;
   connecting the switch terminal to one or more of the second terminal, the charge interface, and the auxiliary interface using a switch signal; and
   providing the boost signal for a boost function and the charge signal for a charge function.

10. The method according to claim 9, further comprising determining the switch signal depending on an operation function of the electric vehicle.

11. The method according to claim 9, further comprising switching from the charge function to the boost function when an actual energy value falls below the threshold value or from the boost function to the charge function when the actual energy value exceeds the threshold value.

12. The apparatus according to claim 1, wherein the detection device is arranged between the auxiliary interface and the auxiliary drive.

13. The apparatus according to claim 12, wherein the detection device is a sensor unit.

* * * * *